United States Patent [19]
Fryzel

[11] 3,769,854
[45] Nov. 6, 1973

[54] STRUCTURE FOR AND METHOD OF AUTOMATIC BALANCING OF A ROTATING MEMBER

[75] Inventor: Ronald A. Fryzel, Dearborn Heights, Mich.

[73] Assignee: The Detroit Edison Company, Detroit, Mich.

[22] Filed: July 26, 1971

[21] Appl. No.: 166,041

[52] U.S. Cl. .................. 74/573, 73/455, 73/468, 64/1 V
[51] Int. Cl. ............................................. F16f 15/32
[58] Field of Search ............... 74/573; 73/458, 455, 73/469, 468; 64/1 V

[56] References Cited
UNITED STATES PATENTS

| | | | |
|---|---|---|---|
| 2,441,152 | 5/1948 | Kelleher et al. | 73/469 X |
| 2,731,833 | 1/1956 | Jones | 73/469 X |
| 2,915,918 | 12/1959 | Comstock et al. | 74/573 |
| 3,248,967 | 5/1966 | Lewis | 74/573 X |
| 3,371,450 | 3/1968 | Board, Jr. et al. | 74/573 X |

Primary Examiner—Charles J. Myhre
Assistant Examiner—F. D. Shoemaker
Attorney—L. Gaylord Hulbert et al.

[57] ABSTRACT

Structure for and a method of minimizing static imbalance of a rotating member including a pair of balance arms with adjustable weights thereon positioned at 90° with respect to each other and secured to the rotating member, a velocity responsive member for developing an alternating electric signal, the magnitude of which is proportional to the magnitude of the static imbalance of the rotating member and a computing circuit for reducing the alternating signal proportional to the static imbalance into direct current vector components at right angles to each other aligned with the balance arms and electric motor, screw and nut structures for moving the weights on the balance arms toward and away from the rotating member in accordance with the vector components of the static imbalance signal in a direction to eliminate the static imbalance of the rotating member and the method of operation thereof.

10 Claims, 9 Drawing Figures

INVENTOR
RONALD A. FRYZEL

BY Whittemore
Hulbert & Belknap
ATTORNEYS

INVENTOR
RONALD A. FRYZEL
BY Whittemore
Hulbert & Belknap
ATTORNEYS

STRUCTURE FOR AND METHOD OF AUTOMATIC BALANCING OF A ROTATING MEMBER

BACKGROUND OF THE INVENTION

1. Field of the Invention

The invention relates to static balancing of rotating members and refers more specifically to structure for and a method of adjusting weights secured to a rotating member for rotation therewith in accordance with the static imbalance of the rotating member and in a direction to eliminate the static imbalance of the rotating member including velocity responsive means for developing an alternating electrical signal representative of the magnitude and direction of the static imbalance of the rotating member, computer means for resolving the alternating signal proportional to the static imbalance of the rotating member into direct current vector component signals in the directions of adjustment of the weights and means for adjusting the weights in response to the direct current signals.

2. Description of the Prior Art

When rotating machinery such as induced draft fans and turbine generators used by power generating public utilities are operated over a range of speeds and loads, unbalanced forces transmitted to the bearings and foundation of the equipment change with machine speed and load. Such machines are normally balanced when vibration amplitudes due to the unbalanced forces reach a certain predetermined level variable with the particular machine.

When a rotatable machine has been balanced in the past, it has usually required the taking of initial vibration amplitudes and phasing angle readings for the initial condition of the rotor of the equipment for various positions on the machine bearings where vibration amplitudes are to be minimized. With such balancing procedures, trial masses are then inserted in balancing planes connected to the rotor for rotation therewith and the resultant rotor vibration amplitudes and phase angles are measured, after which response co-efficients, at each vibration measuring position of a unit correction mass in each balance plane is calculated. The response co-efficients are used to calculate a set of correction masses in the various balance planes that will as nearly as possible cancel out the initial rotor vibrations and then the correction masses are installed and another set of vibration amplitude and phase angles are taken to see if further balancing is required. Due to inaccuracies in data obtained and non-linearities in the systems being balanced, it is often necessary or desirable to attempt a further improvement in the rotor balance.

Such balancing procedure is undesirable due to the amount of down time required of the rotating equipment for the performance of manual balancing operations. Since in a majority of instances, the state of imbalance, for example, of an induced draft fan is static and can be corrected by inserting a correction mass in a single balance plane, it would be economical to provide automatic balancing equipment which senses the static imbalance of a rotating member and provides a correction therefor during operation of the rotating equipment.

SUMMARY OF THE INVENTION

The invention is a structure for and a method of eliminating static imbalance in a rotating member such as the shaft of an induced draft fan or a turbine generator while the rotating member is rotating. Thus, the down time of the rotating member and the equipment associated therewith is minimized to provide economical operation of the equipment associated with the rotating member.

More specifically, the invention includes a pair of balance arms secured to a shaft for rotation therewith and extending radially therefrom perpendicular thereto and to each other, each of which balance arms includes a weight adjustably secured therein and means responsive to the vibration of the shaft during rotation for adjusting the adjustable weights to minimize the static imbalance of the shaft.

The method of the invention includes developing an alternating electrical signal proportional to the velocity of displacement of a portion of the shaft, resolving the developed vibration signal into direct current components in the direction of the balance arms and adjusting the weights in the balance arms in accordance with the magnitude of the direct current signals.

DESCRIPTION OF THE PREFERRED EMBODIMENT

Figure 1:
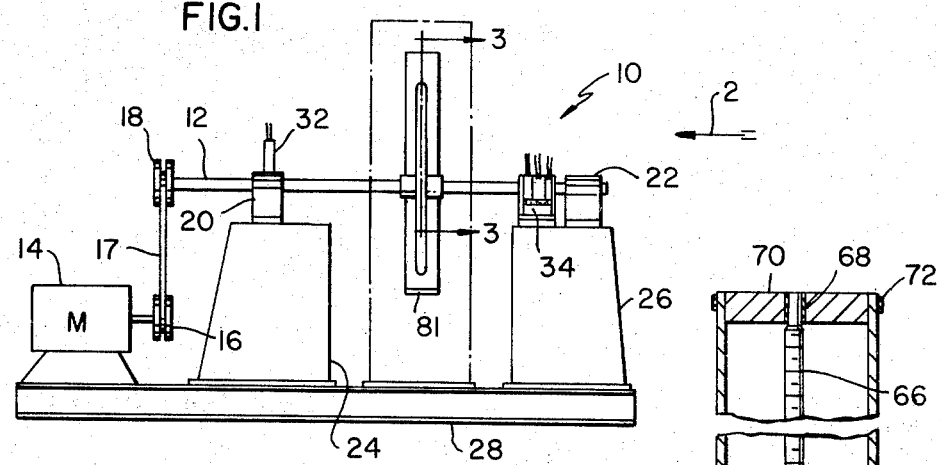
FIG. 1 is a front view of automatic balancing equipment constructed in accordance with the invention for practicing the method of the invention.

As shown best in FIG. 1, the automatic balancing equipment 10 of the invention is operably associated with a rotatable shaft 12 which as shown is rotated by motor 14 through pulleys 16 and 18 connected by belt 17. The shaft 12 may be, for example, the shaft of an induced draft fan used by public utilities or the like. The shaft 12, as shown, is mounted in bearings 20 and 22 on the supports 24 and 26 attached to the base 28. Motor 14 is also secured to the base 28.

Figure 2:
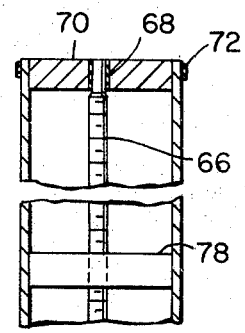
FIG. 2 is a side elevation view of the automatic balancing equipment illustrated in FIG. 1, taken in the direction of arrow 2 in FIG. 1.
Figure 2:
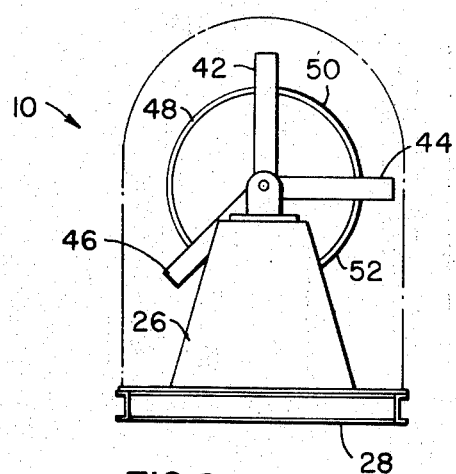
Figure 6:
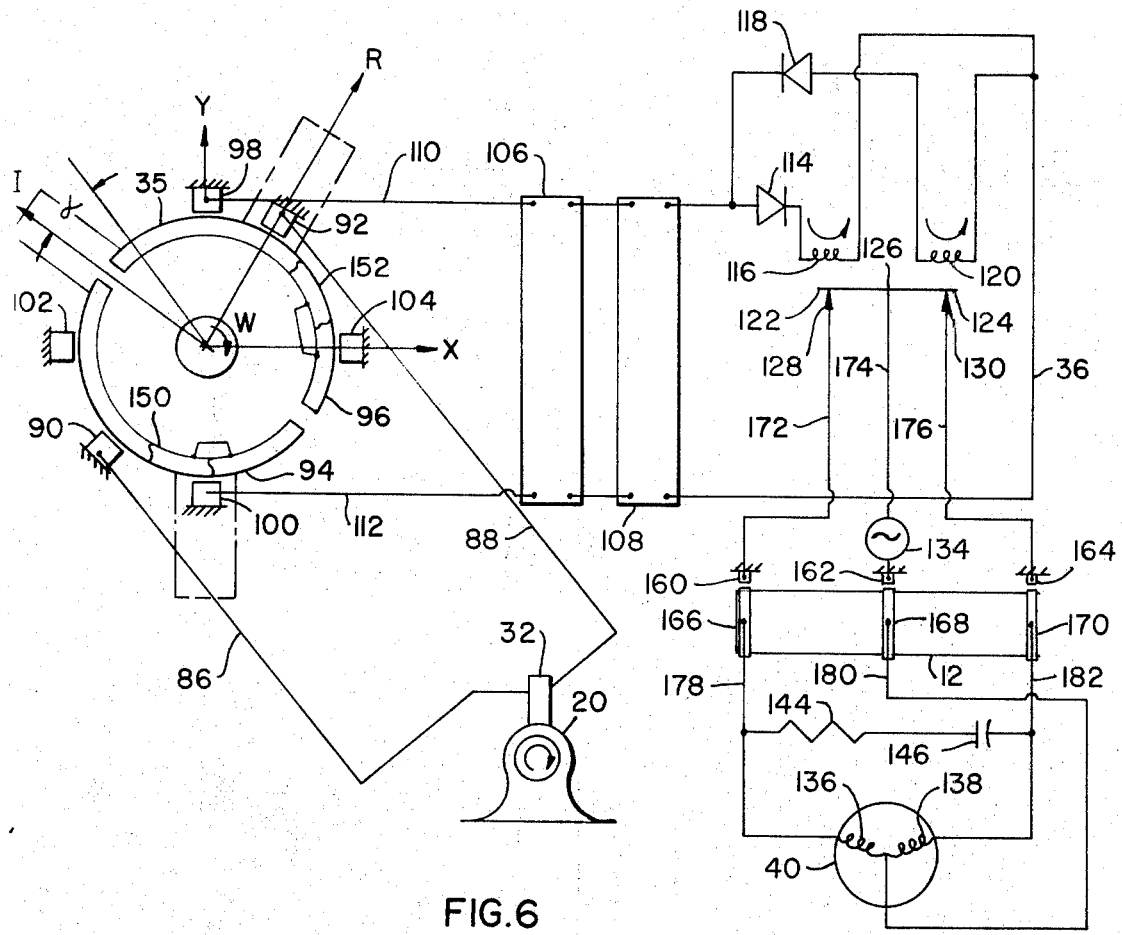
FIG. 6 is a partially schematic, partially diagrammatic representation of the electrical circuit of the automatic balancing equipment illustrated in block diagram in FIG. 5.

The automatic balancing equipment 10 in particular includes the vibration velocity to electrical signal transducer 32, the split ring computer 34, the motor energizing circuit 36 illustrated best in FIG. 6, and the motor 40. A separate motor energizing circuit 36 and motor 40 are provided in conjunction with each of the balance arms 42 and 44 which are also part of the automatic balancing equipment 10 and, as shown best in FIGS. 1 and 2, are rigidly connected to the collar 82 on shaft 12 for rotation therewith. A counterbalance arm 46 extends in a direction opposite the balance arms 42 and 44 and is also secured to collar 82. All of the balance arms 42 and 44 and the counterbalance arm 46 are connected together by three arcuate structural sections 48, 50 and 52 rigidly secured thereto as shown best in FIG. 2.

Figure 3:
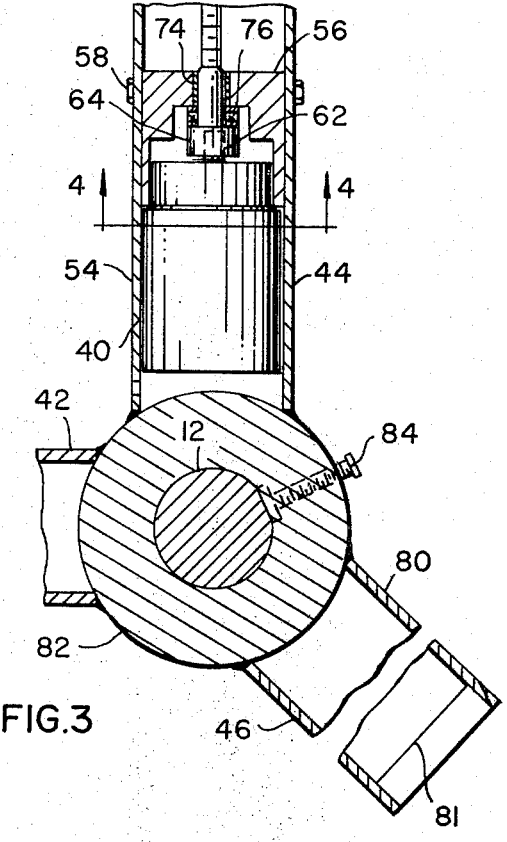
FIG. 3 is an enlarged, broken, partial section view of the automatic balancing equipment illustrated in FIG. 1, taken substantially on the line 3—3 in FIG. 1.

In more detail, each of the balance arms 42 and 44 are identical and are secured on the shaft 12 by collar 82 perpendicular thereto and to each other as shown best in FIG. 3. Only balance arm 44 will therefore be considered in detail.

Figure 4:
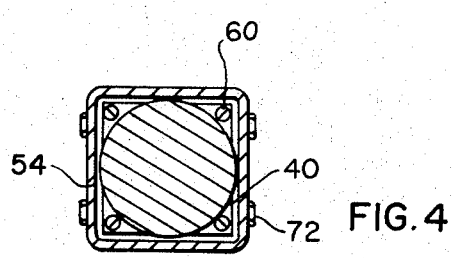
FIG. 4 is a transverse cross section of one balance arm of the automatic balancing equipment illustrated in FIG. 1, taken substantially on the line 4—4 in FIG. 3.

Balance arm 44 includes the section of structural tubing 54 secured to the collar 82 on shaft 12 as by welding or the like. A motor mount 56 is secured in the tubing 54 by convenient means such as bolts 58 and secures the motor 40 which is connected thereto by screws 60 illustrated best in FIG. 4 in the tube 54. The output shaft 62 of the motor 40 is non-circular and is engaged in a similar non-circular recess in the head 64 of the screw 66 whereby the screw 66 is rotated on actuation of the motor 40 in either direction.

Screw 66 is mounted for rotation within the tube 54 in the bearing 68 set in end plate 70 held in the tube 54 by bolts 72 and the bearing 74 positioned between the screw 66 and the motor mount 56. A thrust bearing 76 is provided between the head 64 of the screw 66 and the motor mount 56, all as shown best in FIG. 3.

A balancing weight 78 is threadedly engaged with the screw 66 for movement along the tube 54 in accordance with the rotation of the screw 66. Thus, the position of the weight 78 radially of the shaft 12 depends upon the rotational position of the screw 66. Whether the weight 78 is moved radially outwardly or radially inwardly of the shaft 12 from any rest position thereof is determined by the direction of rotation of the motor 40.

The motor 40 in turn is actuated in accordance with a direct current signal proportional to a resolved component of an alternating signal representative of the static imbalance of the rotating shaft 12. Thus, on actuation of the motor 40, the weight 78 and a similar weight in the balance arm 42 are moved radially toward or away from the shaft 12 independently in an attempt to eliminate any static imbalance of the shaft 12. In actual practice, the operation of the motors 40 may be limited to that produced by a vibration caused by a static imbalance of shaft 12 greater than a predetermined level.

The counter arm 46 is provided to balance the balancing arms 42 and 44 to relieve static imbalance of the shaft 12 caused by the addition of the balance arms 42 and 44 thereto. Thus, the counter arm 46 extends radially of the shaft 12 at an angle of 135° about shaft 12 from each of the balance arms 42 and 44 which are 90° apart about shaft 12 so that the axis of the counter arm 46 bisects the angle formed by the intersection of the axes of the balance arms extending through the center of the shaft 12.

Again, the counter arm 46 is a structural tubing member 80 which is rigidly secured to the hub 82 along with the balance arms 42 and 44. The hub 82 is in turn secured to the shaft 12 by means of the set screw 84. Weight 81 is provided in counter arm 46.

The velocity to alternating electrical signal transducer 32, as shown best in FIG. 6, is secured to bearing mounting 20 for the shaft 12 at a position where it is desired to reduce or eliminate vibration. Velocity to electrical energy transducers are well known in the art. The particular velocity to electrical energy transducer 32 used in the present automatic balancing equipment will not therefore be considered in detail since by itself it forms no part of the present invention.

Figure 7:
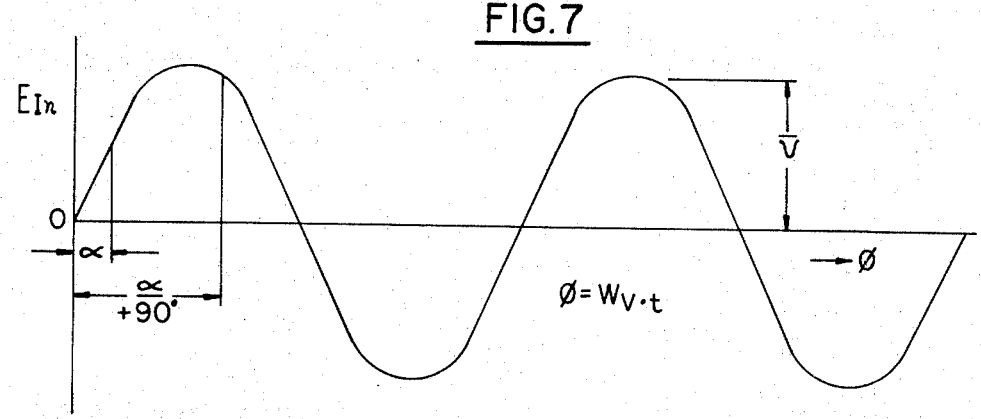
FIG. 7 is a graph representing the velocity of a point on a support for the rotating shaft illustrated in FIG. 1 and therefore a voltage proportional thereto.

It will, however, be noted that transducer 32 produces a signal across conductors 86 and 88 at terminals 90 and 92 of computer 34 which is a sinusoidal signal, as illustrated in FIG. 7, having an amplitude $\bar{v}$. The velocity signal will have the same period as the rotating shaft 12 so that the input signal to the computer 34 may be expressed as $E_{in} = \bar{v}_{sin}(W_v \, t)$.

The computer 34 includes two separate and nearly identical split ring commutators 35, each of which is composed of a split ring having halves 94 and 96 and solid rings 150 and 152, only partly shown in FIG. 6, which are positioned on the shaft 12 for rotation therewith. All of the split ring halves 94 and 96 and the solid rings 150 and 152 are insulated from each other and from the shaft 12. For each split ring commutator the solid ring 150 is electrically connected to split ring half 94 while solid ring 152 is electrically connected to split ring half 96. Straight lines drawn through the insulating gaps between split ring halves 94 and 96 of each split ring commutator and drawn so as to bisect the split ring halves will make an angle of 90° with respect to each other. As shown in FIG. 6, the I axis of the balance arm 42 extends exactly between the split ring halves 94 and 96 of one split ring commutator while the R axis of balance arm 44 extends at 90° to the I axis and bisects the split ring half 96.

Figure 8:
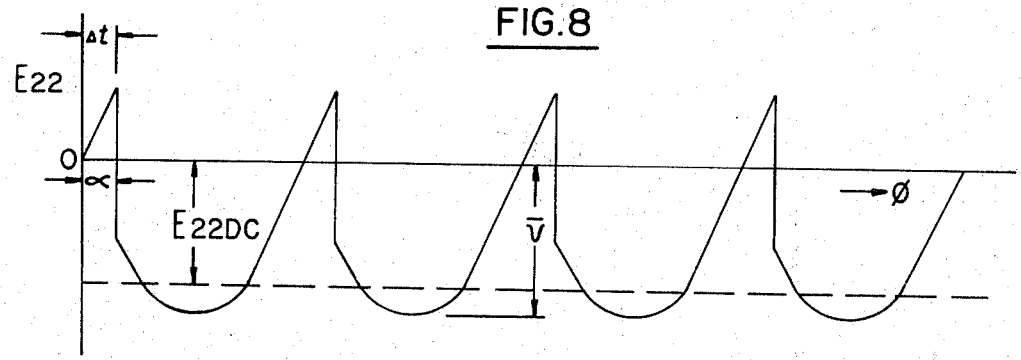
FIGS. 8 and 9 are graphs representing the voltage output from the split ring computer illustrated in FIG. 6 at the terminals providing components of the alternating electrical signal illustrated in FIG. 7, resolved in the direction of the balance arms in the plane of the balance arms of the automatic balancing equipment.
Figure 9:
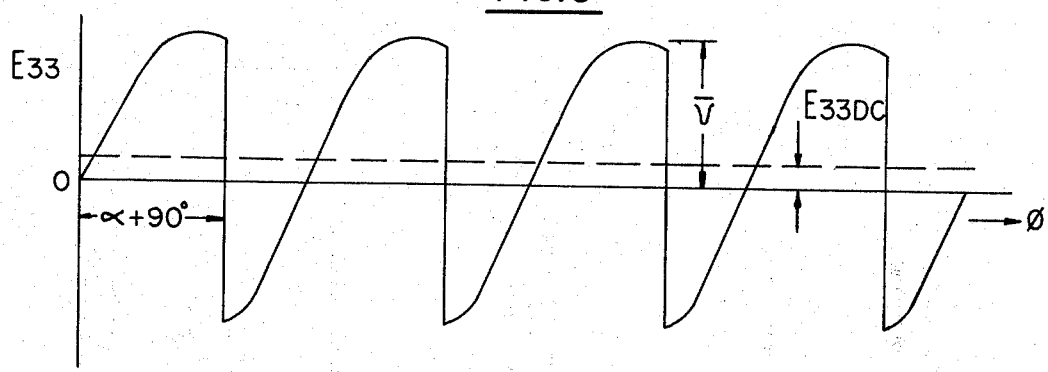

Separate electrodes 98 and 100 and electrodes 102 and 104 are associated with the balance arms 42 and 44 respectively and serve to provide an alternating current signal from the separate split ring commutators having a wave shape as illustrated in FIGS. 8 and 9 which is determined by the vibration of the shaft 12 at the point of connection of the velocity to electrical signal transducer 32 to the shaft bearing support 20 and the relative position of the halves 94 and 96 of the split ring and the brushes 90 and 92.

All of the electrodes 98 and 100, 102 and 104, and 90 and 92 may be carbon brushes engaged with the solid rings 150 and 152 and the ring halves 94 and 96 of the split ring commutators.

Thus, for example, for Y axis correction the electrodes 90 and 92 may be engaged with separate solid rings 150 and 152 respectively, the electrode 98 may be engaged with split ring half 96 and the electrode 100 may be engaged with split ring half 94 as shown in FIG. 6. For X axis correction, electrodes 90 and 92 are engaged with other solid rings 150 and 152 and electrodes 102 and 104 are engaged with other split ring halves 94 and 96.

On rotation of the shaft 12 and therefore the computer 34, the signals appearing at the terminals 98 and 100, and 102 and 104, will, due to the split ring structure, be as illustrated in FIG. 8 and FIG. 9, due to the reversal of polarity as the ends of the split ring halves 94 and 96 pass the electrodes engaged therewith. The input to the split ring halves is provided by stationary brushes 90 and 92 connected to transducer 32 and is shown in FIG. 7. The output to the motor actuating circuit is through brushes 98 and 100 for Y axis corrections and through brushes 102 and 104 for X axis corrections.

Each of the signals in FIGS. 8 and 9 are used to provide a direct current signal to actuate a motor 40 in the balance arms 42 and 44 through a motor actuating circuit 36, one of which is shown associated with terminals 98 and 100 in FIG. 6. The motor actuating circuit 36 includes electrical filter 106 and amplifier 108 connected across the conductors 110 and 112 from electrodes 98 and 100. The diode 114 connected in series with the solenoid coil 116 and the oppositely directed diode 118 connected in series with the solenoid coil 120, both of which are connected in parallel with the series diode 114 and solenoid coil 116 and in parallel across the filter 106 and amplifier 108.

Figure 5:
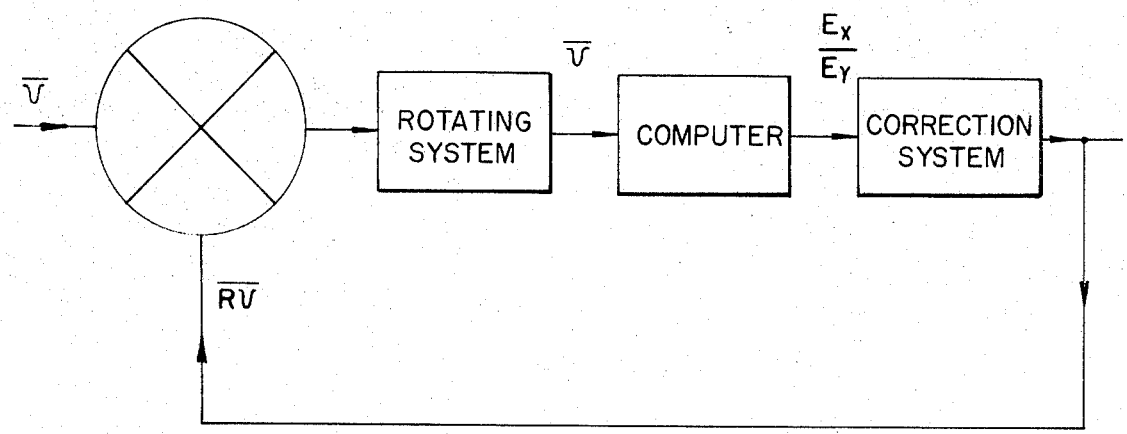
FIG. 5 is a block diagram illustration of the automatic balancing equipment illustrated in FIG. 1.

The solenoid coils 116 and 120 are associated with the opposite ends 122 and 124 of a balance switch 126. Thus, in operation, as a result of a signal at the terminals 98 and 100, which signal is filtered through filter 106 and is amplified in amplifier 108, and which signal then passes through either the diode 114 and coil 116 or the diode 118 and coil 120, depending also upon the weighting of the polarity thereof, will cause the switch 126 to lower either end 122 or 124 in FIG. 5 and make contact with the contact elements 128 or 130 of the switch 126 to ultimately cause the motor 40 to operate in opposite directions.

Since the signal passing through the solenoid coils 116 and 120 is a direct current signal proportional to the magnitude of the rotating imbalance force, the switch 126 will be closed to operate the motors 40 in a direction to minimize the vibration at the transducer 32.

The motors 40, as indicated previously, are reversible motors and are actuated to drive a weight 78 up or down in accordance with actuating power supplied thereto from the source of alternating energy 134 in accordance with which of the windings 136 and 138 of the motors are actuated.

Power can be fed to the motor 40 and motor field winding 136 or 138 through electrical conductors 172, 174, and 176 which are connected respectively to electrodes 160, 162, and 164. Electrodes 160, 162, and 164 are in contact with slip rings 166, 168, and 170 located on shaft 12. Slip ring 166, 168, and 170 are insulated electrically from each other and shaft 12 and are electrically connected to wires 178, 180, and 182 of motor 40. Resistor 144 and capacitor 146 of motor 40 form a phase splitting network.

While one embodiment of the invention has been considered in detail, it will be understood that other modifications and embodiments are contemplated. It is the intention to include all modifications and embodiments of the invention within the scope of the appended claims.

What I claim as my invention is:

1. Structure for automatically balancing a rotating member having an axis of rotation while it is rotating about the axis of rotation thereof, comprising at least two balance weights operably secured to the rotating member at angularly spaced apart positions about the axis of rotation of the rotating member for rotation therewith, separate means connected to the weights for independently moving the weights radially of the axis of rotation of the rotating member, means for sensing the static imbalance of the rotating member, and means connected to the sensing means for providing separate drive signals in accordance with the sensed static imbalance of the rotating member for each of the means for moving the weights radially of the axis of rotation of the rotating member while the rotating member is rotating.

2. Structure as set forth in claim 1, wherein the means for moving each of the weights radially of the axis of rotation of the rotating member comprises a separate reversible motor secured to the rotating member and separate screw and nut structures connected between each of the weights and one of the separate motors whereby the respective weights move radially of the axis of rotation of the rotating member on rotation of the corresponding motors in accordance with the direction of rotation of the motor.

3. Structure as set forth in claim 1, wherein the means for sensing the static imbalance of the rotating member comprises a velocity probe secured to a mounting for the rotating member for developing an electrical signal proportional to the velocity of movement of the mounting for the rotating member at the location of the velocity probe.

4. Structure as set forth in claim 1, wherein the two weights are operably secured to the rotating member at right angles to each other about the axis of rotation of the rotating member.

5. Structure as set forth in claim 4, wherein the means for providing a driving signal includes a split ring computer for resolving alternating signals into direct current vector components in the direction of the two weights and the weights are driven differentially thereby to reduce the static imbalance of the rotating member to a minimum.

6. Structure as set forth in claim 1, wherein the means for providing the driving signals comprises a split ring computer.

7. Structure as set forth in claim 1, and further including a counterweight secured to the rotating member opposite the balance weights to offset the weight of the balance weights with regard to static imbalance of the rotating member.

8. The method of automatic balancing of a rotating member comprising operably securing separate weight means to the rotating member at angularly spaced apart locations thereon, sensing the static imbalance of the rotating member and moving the weight means radially of the axis of rotation of the rotating member in accordance with the sensed static imbalance in a direction to minimize the static imbalance of the rotating member while the rotating member is rotating.

9. The method as set forth in claim 8, wherein the weight means includes two weights which are operably secured to the rotating member at right angles to each other about the axis of rotation of the rotating member, and further including the step of resolving the sensed static imbalance of the rotating member into components for driving the weights radially of the rotating member.

10. The method as set forth in claim 8, and further including counterbalancing the weight means.

* * * * *